(12) United States Patent
Bittner (10) Patent No.: US 8,758,023 B2
(45) Date of Patent: *Jun. 24, 2014

(54) ANTLER MOUNTING KIT

(71) Applicant: CamoBitt LLC, Gladwin, MI (US)

(72) Inventor: Kenneth Bittner, Gladwin, MI (US)

(73) Assignee: CamoBitt LLC, Gladwin, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,876

(22) Filed: Jun. 25, 2013

(65) Prior Publication Data

US 2014/0010974 A1    Jan. 9, 2014

Related U.S. Application Data

(63) Continuation of application No. 13/168,489, filed on Jun. 24, 2011, now Pat. No. 8,512,045.

(60) Provisional application No. 61/398,462, filed on Jun. 25, 2010, provisional application No. 61/455,493, filed on Oct. 21, 2010.

(51) Int. Cl.
*B44C 5/02* (2006.01)

(52) U.S. Cl.
USPC ................. 434/296; 428/34.1; 428/542.4

(58) Field of Classification Search
USPC ................. 428/34.1, 542.4, 16; 434/296
See application file for complete search history.

(56) References Cited

U.S. PATENT DOCUMENTS

| | | | |
|---|---|---|---|
| 2,831,271 A | 4/1958 | Stitt | |
| 4,464,440 A | 8/1984 | Dotzman | |
| 4,477,500 A | 10/1984 | Powell | |
| 4,775,323 A | 10/1988 | Johnson | |
| 4,971,865 A | 11/1990 | Nowlan | |
| 5,472,765 A | 12/1995 | Green | |
| 6,007,881 A | 12/1999 | Lennard | |
| 6,458,434 B1 | 10/2002 | Coombs, Jr. | |
| 6,799,974 B2 | 10/2004 | Martin et al. | |
| 6,884,080 B2 | 4/2005 | Thompson | |
| 7,243,888 B2 | 7/2007 | Peek | |
| 7,857,266 B2 | 12/2010 | Damin | |
| 2006/0154224 A1 | 7/2006 | St. Ama | |
| 2008/0069977 A1 | 3/2008 | McAbee | |
| 2009/0075245 A1 | 3/2009 | Hacke | |
| 2011/0031363 A1 | 2/2011 | Shaw | |
| 2011/0091857 A1 | 4/2011 | Eppley | |
| 2011/0091858 A1 | 4/2011 | Eppley | |
| 2011/0183085 A1 | 7/2011 | Spiess | |

OTHER PUBLICATIONS

Mountain Mikes Reproductions, http://masterofskulls.com, accessed and printed on May 25, 2011, 1 page.

*Primary Examiner* — Alexander Thomas (74) *Attorney, Agent, or Firm* — Bejin VanOphem & Bieneman PLC (57) ABSTRACT

An antler mounting kit is used to display antlers obtained from an animal. The antler mounting kit comprises a body that is formed from a polymer and that replicates natural contours of at least a portion of a head of the animal. A mounting base is fixed relative to the body and is positioned to support the antlers in an anatomically correct position that replicates antler position on the head of the animal. The body defines a cutout extending along the mounting base for receiving a base of the antlers. A cover replicates natural contours of a portion of the head of the animal and abuts the body and covers the cutout for concealing the base of the antlers.

19 Claims, 6 Drawing Sheets

ANTLER MOUNTING KIT

CROSS-REFERENCE TO RELATED APPLICATIONS

The subject patent application is a continuation of U.S. patent application Ser. No. 13/168,489 filed on Jun. 24, 2011, now issued as U.S. Pat. No. 8,512,045, which claims priority to and all the benefits of U.S. Provisional Patent Application No. 61/398,462 filed on Jun. 25, 2010 and U.S. Provisional Patent Application No. 61/455,493 filed on Oct. 21, 2010, the entire disclosures of each being expressly incorporated herein by reference.

BACKGROUND OF THE INVENTION

1. Field of the Invention

The present invention includes an antler mounting kit for displaying antlers obtained from a live animal.

2. Description of the Related Art

Many big game animals, such as deer, elk, moose, etc., have antlers and big game hunters often display antlers from animals that they harvest. Antlers are displayed in a variety of ways. One such way is to mount the antlers to a plaque and to cover a skull plate of the antlers with a covering such as felt or leather. Another more expensive way to display the antlers is referred to as a European mount in which the skull is cleaned and bleached to display the antlers. A yet more expensive way to display the antlers is with a taxidermy mount. For the taxidermy mount, a taxidermist will remove and tan the hide of the animal and place the hide on a form that looks similar to the animal. The antlers are then secured to the form so that the hide and the antlers resemble the animal.

Both the European mount and the taxidermy mount typically require the expertise of a professional taxidermist who charges fees for such services. As such, the expense of the European mount and the taxidermy mount can be prohibitive to some hunters. Many hunters reserve the European mount or the taxidermy mount for large sized antlers.

Still, some hunters who harvest animals with large sized antlers cannot, or choose not, to spend the money associated with the European mount or the taxidermy mount. Further, the hunter who harvests an animal with small or average sized antlers is even less likely to spend the money associated with the European mount or the taxidermy mount due to a lessened desire to display the antlers. In both of these situations, the hunter can attempt to avoid taxidermy costs by mounting the antlers to the plaque and covering the skull plate with a covering of felt or leather, as set forth above; however, this technique can be tedious, requires the undesirable step of cleaning the skull plate, and results in a less grand presentation of the antlers. As such, many antlers are not displayed due to the lack of an inexpensive and easy way of mounting antlers. Accordingly, there remains an opportunity to manufacture an improved product for displaying antlers and a method of doing the same.

SUMMARY OF THE INVENTION AND ADVANTAGES

The present invention includes an antler mounting kit for displaying antlers obtained from a live animal. The antler mounting kit comprises a body that is formed from a polymer and that replicates natural contours of at least a portion of a head of the live animal. A mounting base is fixed relative to the body and is positioned to support the antlers in an anatomically correct position that replicates antler position on the head of the live animal. The body defines a cutout extending along the mounting base for receiving a base of the antlers. A cover replicates natural contours of a portion of the head of the live animal and abuts the body and covers the cutout for concealing the base of the antlers.

Accordingly, a user can easily and quickly mount antlers to the antler mounting kit in an aesthetically pleasing way. Further, the antler mounting kit can be easily and quickly manufactured without time intensive and expensive steps such as tanning the hide of the animal.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
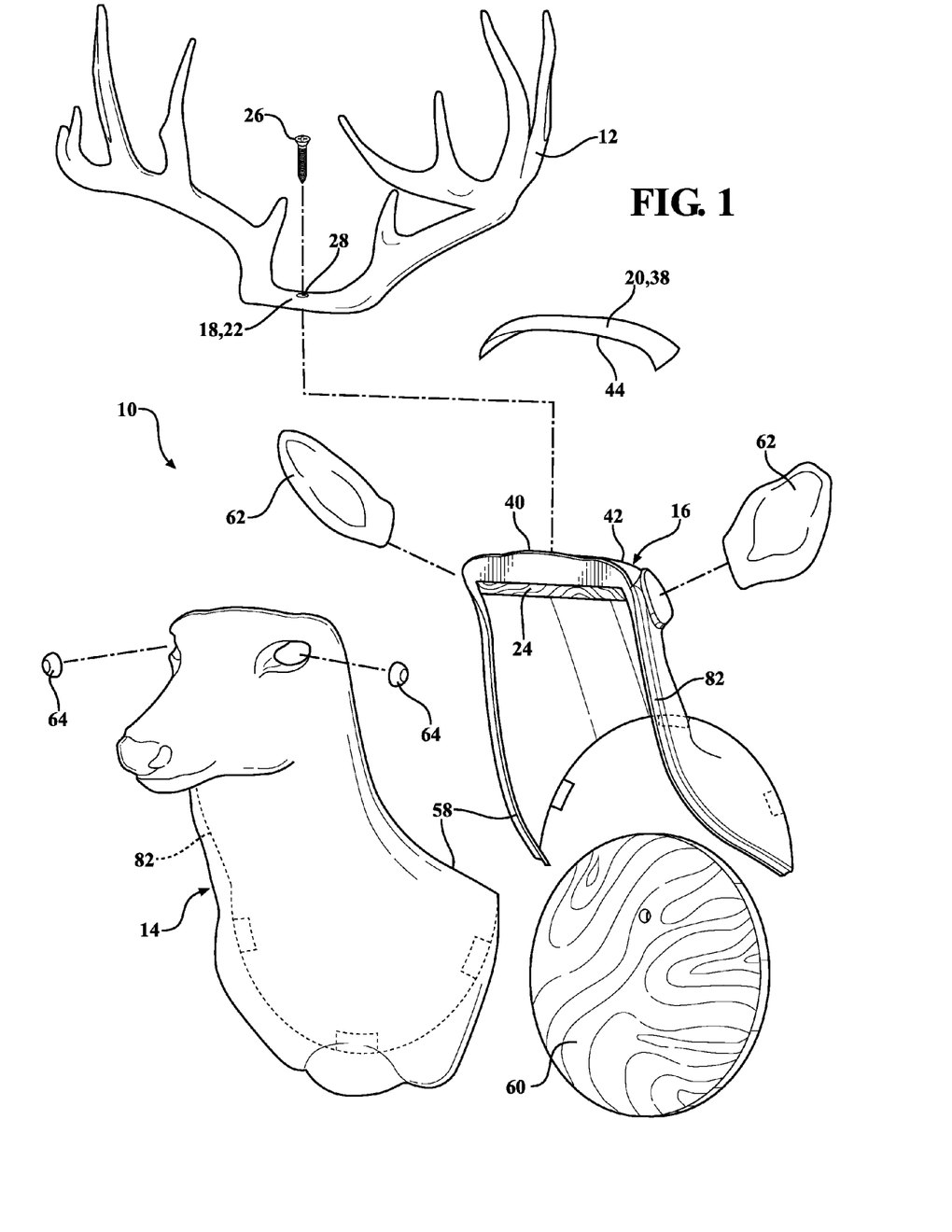
FIG. 1 is an exploded view of a first embodiment of an antler mounting kit and antlers.
Figure 8:
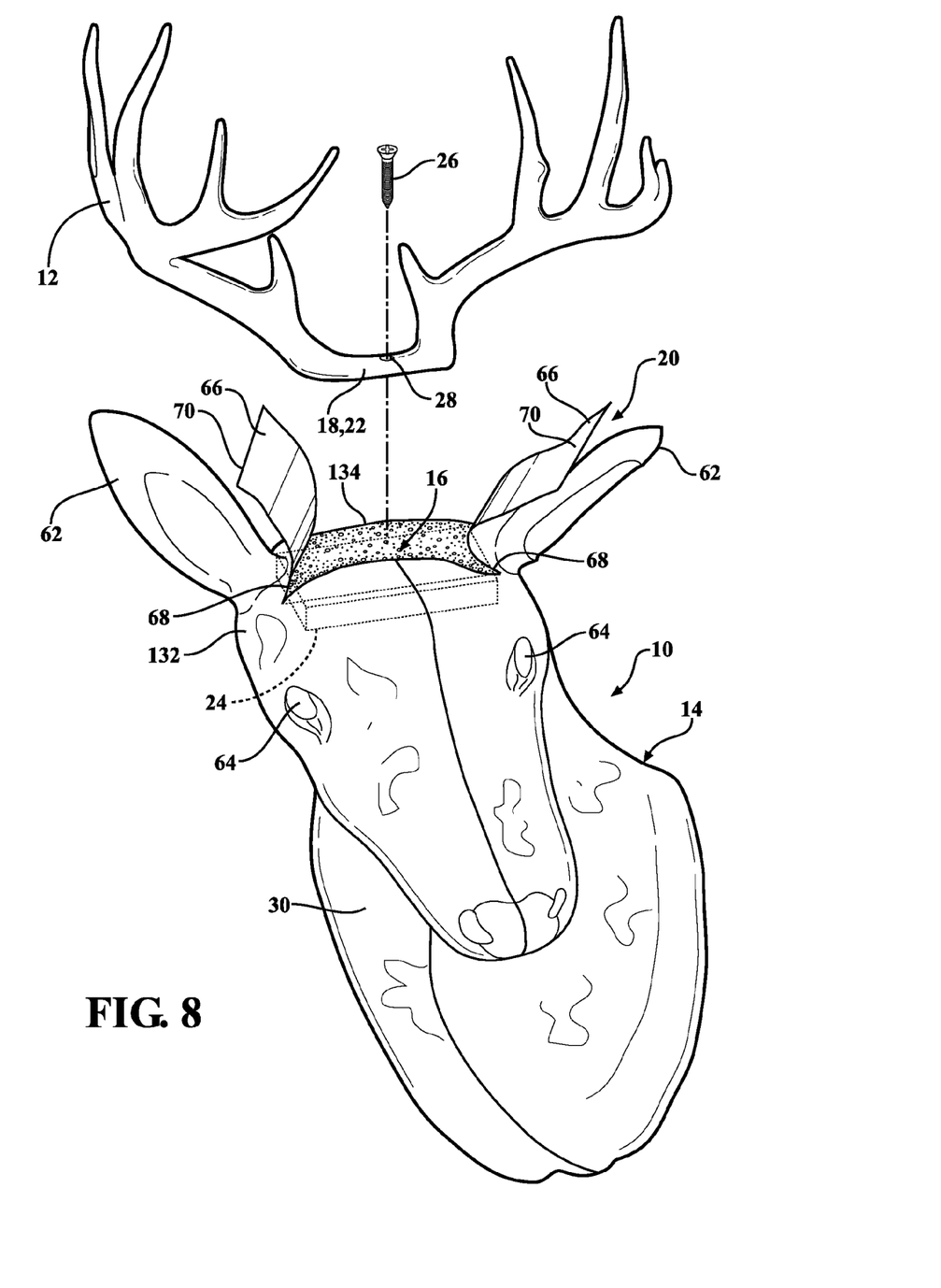
FIG. 8 is a perspective view of a second embodiment of the antler mounting kit and antlers.
Figure 9:
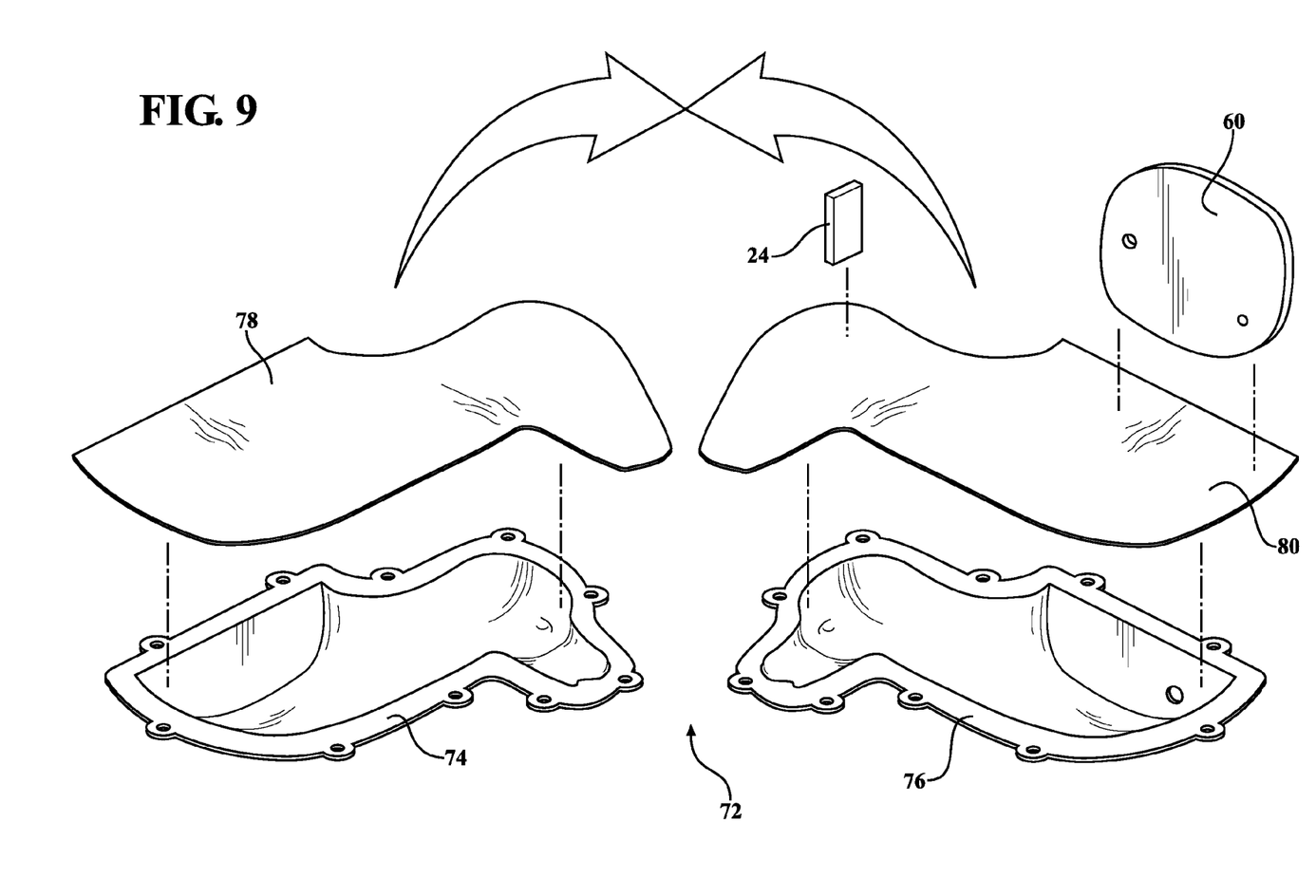
FIG. 9 is a perspective view of a mold for forming the antler mounting kit of the second embodiment.

Referring to the Figures, wherein like numerals indicate like parts throughout the several views, FIG. 1 shows an antler mounting kit 10 for displaying antlers 12. The antlers 12 are typically obtained from a live animal (not shown), e.g., a once-living animal harvested by a hunter. The antlers 12 can be, for example, antlers 12 obtained by a hunter and the antler mounting kit 10 is configured to receive and support the antlers 12 for display, e.g., as a trophy. The antlers 12 shown in FIGS. 3-5 and 9 are antlers 12 from a white-tailed deer; however, it should be appreciated that the term "antlers" includes any type of antler, horn, tusk, etc., permanent or deciduous, from any type of animal. The antlers 12 are alternatively replica antlers that are not obtained from a live animal. As set forth further below, a first embodiment of the antler mounting kit 10 is shown in FIGS. 1-7 and a second embodiment of the antler mounting kit 10 is shown in FIGS. 8 and 9. Similar elements in the first and second embodiments are identified with common numerals.

Figure 2:
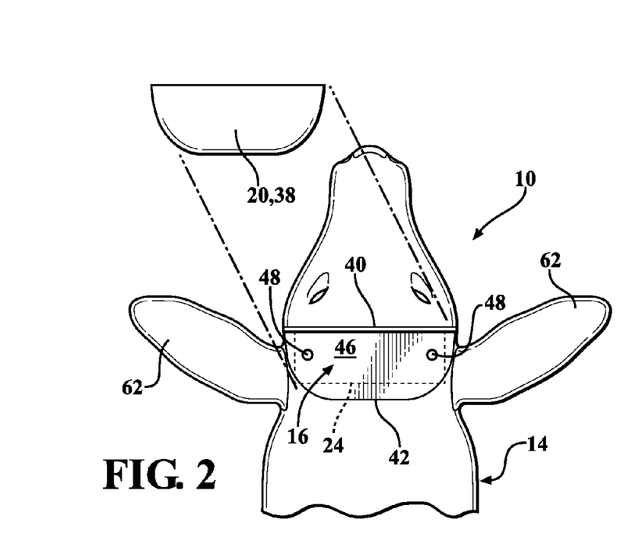
FIG. 2 is a top view of a portion of the first embodiment of antler mounting kit.
Figure 3:
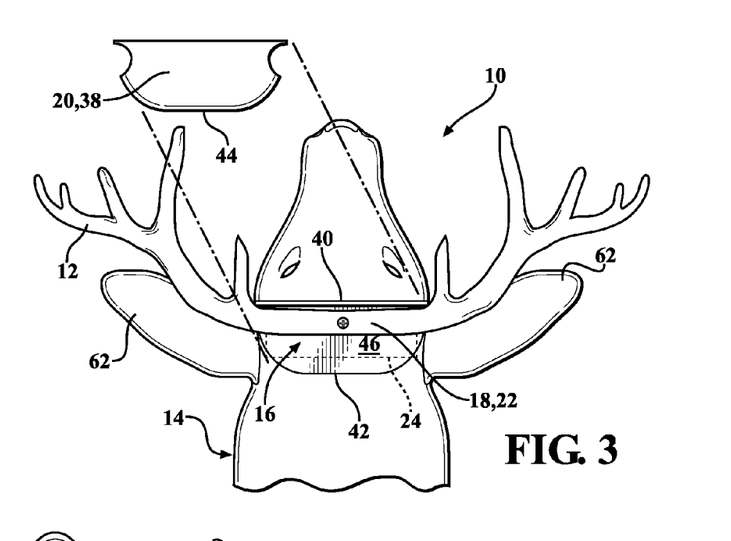
FIG. 3 is a top view of a portion of the first embodiment of the antler mounting kit including antlers mounted to the antler mounting kit.

With reference to FIGS. 1-5 and 8, the antler mounting kit 10 includes a body 14 defining a cutout 16 for receiving a base 18 of the antlers 12 and a cover 20 that covers the cutout 16 for concealing the base 18 of the antlers 12. As best shown in FIGS. 1, 3, and 8, the base 18 of the antlers 12 typically includes a bridge 22 between two antlers 12 that is formed from a portion of the skull of the animal. The cover 20 covers the bridge 22 to conceal the bridge 22 from visibility. Alternatively, although not shown in the Figures, the two antlers 12 can be separated from the skull of the animal, in which case the base 18 of the antlers 12 is the portion of the antler that attaches to the skull and the cover 20 conceals the interface between the base 18 of the antlers 12 and the body 14. For example, shed antlers, i.e., antlers 12 naturally dropped from the skull of the animal at the end of the mating season, can be collected and displayed with the antler mounting kit 10.

The body 14 replicates the natural contours of at least a portion of a head of the live animal and the cover 20 replicates natural contours of a portion of the head of the live animal to cover 20 the cutout 16. In other words, when combined the body 14 and cover 20 can be shaped to anatomically replicate the shape of the type of animal from which the antlers 12 originate. For example, in the embodiments shown in FIGS. 1-5, and 8, the antlers 12 are from a white-tailed deer and, as such, the body 14 and cover 20 anatomically replicate the shape of a portion of a white-tailed deer. As set forth above, the antlers 12 can be from any type of animal and the body 14 and cover 20 can be shaped to anatomically replicate any type of animal. In FIGS. 3-5 and 9, the body 14 and cover 20 replicate the neck and head of the animal, typically referred to as a shoulder mount. Alternatively, the body 14 and cover 20 can anatomically replicate a larger portion of the animal such as, for example, half of the animal or the whole animal. The body 14 and cover 20 can also replicate any type of pose that the animal may assume. For example, the pose shown in FIGS. 1-5 is that commonly referred to in industry as upright straight and the pose shown in FIG. 8 is that commonly referred to in industry as left turn semi-sneak.

The body 14 typically includes features such as ears 62 and eyes 64. As set forth further below, the ears 62 and/or the eyes 64 can be formed separately from the rest of the body 14 and subsequently attached to the rest of the body 14 or, alternatively, can be integrally formed with the rest of the body 14. The formed ears 62 and eyes 64 resemble ears and eyes, respectively, of the live animal.

With reference to FIGS. 1-4 and 8, a mounting base 24 is typically disposed in or on the body 14 and is positioned to support the antlers 12 in an anatomically correct position. In other words, when the antlers 12 are supported by the mounting base 24, the antlers 12 on the antler mounting kit 10 resemble the type of animal from which the antlers 12 originated. The mounting base 24 reinforces the body 14 to support the antlers 12.

With continued reference to FIGS. 1-4 and 8, the mounting base 24 is fixed relative to the body 14 and the body 14 defines the cutout 16 extending along the mounting base 24. In other words, the mounting base 24 is aligned with the cutout 16 such that the base 18 of the antlers 12 can be positioned in the cutout 16 and attached to the mounting base 24 either spaced from the mounting base 24 or in direct contact with the mounting base 24, as set forth further below. The mounting base 24 is typically positioned relative to the body 14 to support the antlers 12 in an anatomically correct position that replicates antler position on the head of the live animal.

As set forth further below, the mounting base 24 is typically formed separately from the body 14 and subsequently affixed to the body 14. The mounting base 24 can be formed of, for example, wood, plastic, metal, etc. Alternatively, the mounting base 24 can be integrally formed with the body 14, i.e., formed together simultaneously or at substantially the same time so as to form a single part. When formed integrally with the body 14, the mounting base 24 is typically formed of the same type of material as the body 14 and is typically formed to be thicker and/or denser than the rest of the body 14 to support the antlers 12.

With reference to FIGS. 1, 3, and 8, the mounting base 24 includes features for rigidly attaching to the antlers 12. For example, when the antlers 12 include the bridge 22, the mounting base 24 can include at least one screw 26 that extends through the bridge 22 of the antlers 12 and into the mounting base 24. Typically a hole 28 is formed in the bridge 22 to receive the screw 26. The mounting base 24 can include features, such as holes (not shown), for receiving the screws or the screws can be configured to be self-drilling. As an alternative or in addition to the screw 26, the mounting base 24 can include any type of clip, tie-down, adhesive, etc., for affixing to the antlers 12. When the antlers 12 do not include the bridge 22, i.e., are separated, the antlers 12 can be mounted to the mounting base 24 with screws, posts, adhesive, clips, tie-downs, etc.

Figure 4:
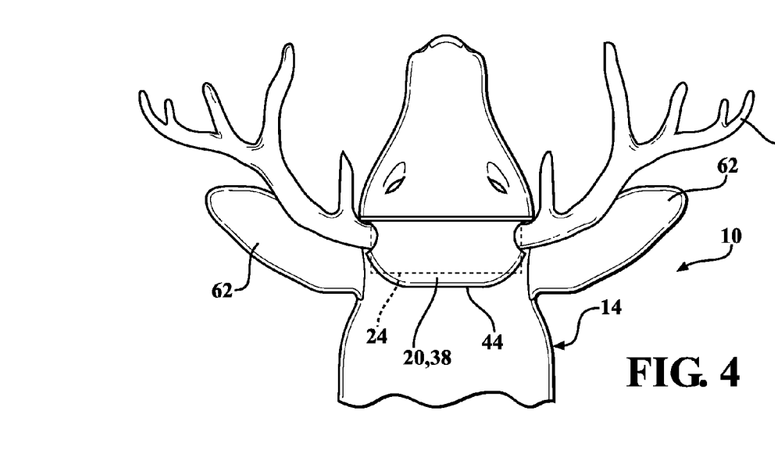
FIG. 4 is a top view of a portion of the first embodiment of the antler mounting kit including a cover concealing a base of the antlers.
Figure 5:
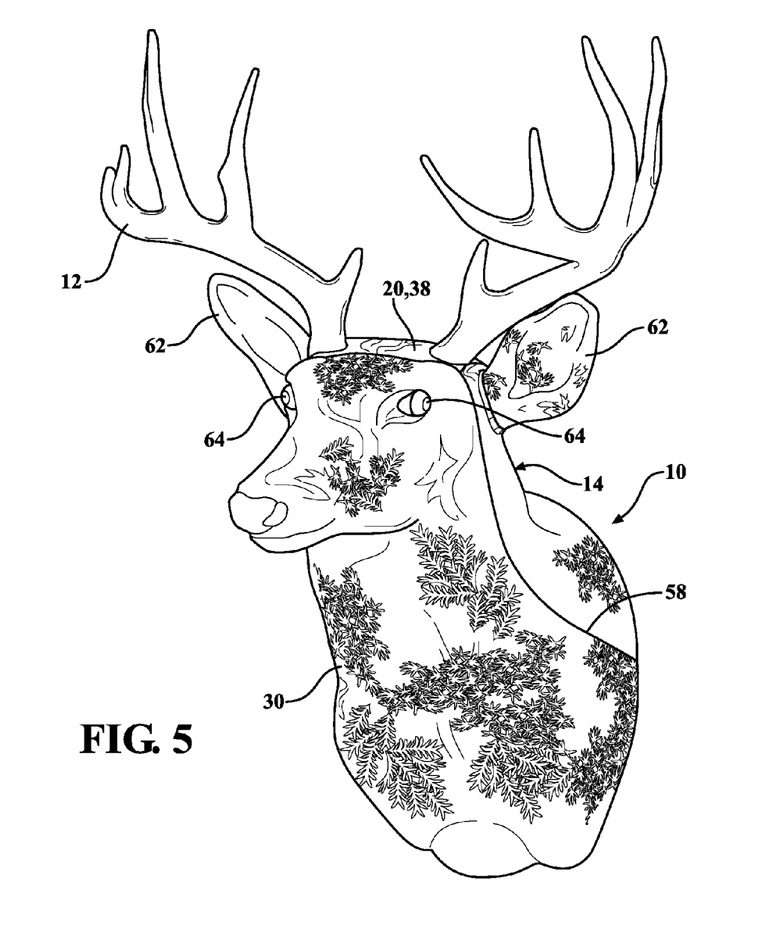
FIG. 5 is a perspective view of the first embodiment of the antler mounting kit with antlers displayed on the antler mounting kit.

With reference to FIGS. 5 and 8, the body 14 includes an outward surface 30 that presents a coloration pattern (not numbered). Merely for illustration purposes so that other features can be adequately shown, the coloration pattern is not shown on the outward surface 30 of FIGS. 1-4. The coloration pattern is typically different than a natural color of the live animal. In other words, when the coloration pattern is different than the natural color of the live animal, the coloration pattern is not intended to duplicate the natural color of the live animal but is instead intended to present the antler mounting kit 10 as a novelty item. The cover 20 typically presents a coloration pattern matching the coloration pattern of the body 14. The coloration pattern can be, for example, a hunting camouflage pattern. For example, the coloration pattern can be natural camouflage, winter camouflage, pink camouflage, leafy camouflage (also referred to in industry as Mossy Oak), camouflage patterns sold under the trademark Realtree®, digital camouflage, flannel, solid colors, or any other type of color and/or pattern combination. In addition or in the alternative, the color pattern can include any sort of logo, text, advertisement, etc. The color pattern can alternatively be a natural color generally matching the color of the type of animal from which the antlers 12 originate.

The outward surface 30 of the body 14 and/or the cover 20 can present a texture (not shown). For example, the texture can be matte, glossy, or can include other textures. The texture can simulate natural features of the animal, such as ridges simulating fur, or can include other types of textures and surface ornamentation.

With reference to FIGS. 1-7, in the first embodiment, the body 14 is typically formed, at least in part, from a polymer. However, it should be appreciated that the body 14 can be formed of any type of material without departing from the nature of the present invention. The cover 20 can be formed from the same type of material as the body 14 or from a different material than the body 14.

Figure 7:
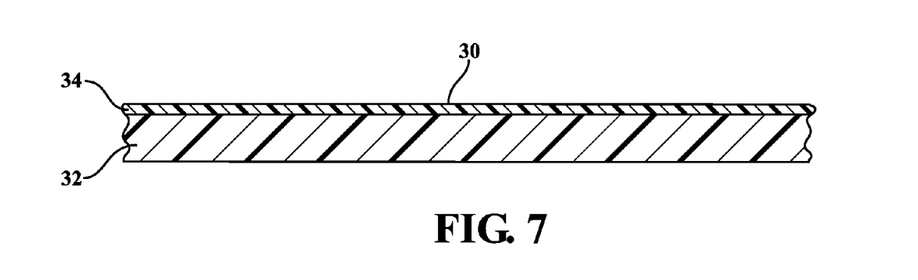
FIG. 7 is a cross-section of the sheet of plastic along line 7-7 in FIG. 6A.

With continued reference to the first embodiment, the body 14 includes an inner layer 32 and an outer layer 34, as shown in the cross-sectional view of FIG. 7. The inner layer 32 can be formed from a plastic such as, for example, acrylonitrile butadiene styrene (ABS). Alternatively, the body 14 can be formed from a vinyl. However, it should be appreciated that the body 14 can be formed from any type of polymer without departing from the nature of the present invention. The plastic of the inner layer 32 is typically between 0.050 inches and 0.375 inches.

Typically the outer layer 34 is laminated to the inner layer 32, as set forth below, and presents the outward surface 30. The outer layer 34 can be, for example, a film laminated to the inner layer 32. The laminated film of the outer layer 34 is typically plastic that is laminated on, i.e., melted to, the plastic of the inner layer 32. The film can, for example, be formed from a plastic such as an acrylic film commercially available under the trademark Korad® by Spartech PEP of Newark, N.J. The laminated film can be printed to have any of the patterns mentioned above.

Figure 6A:
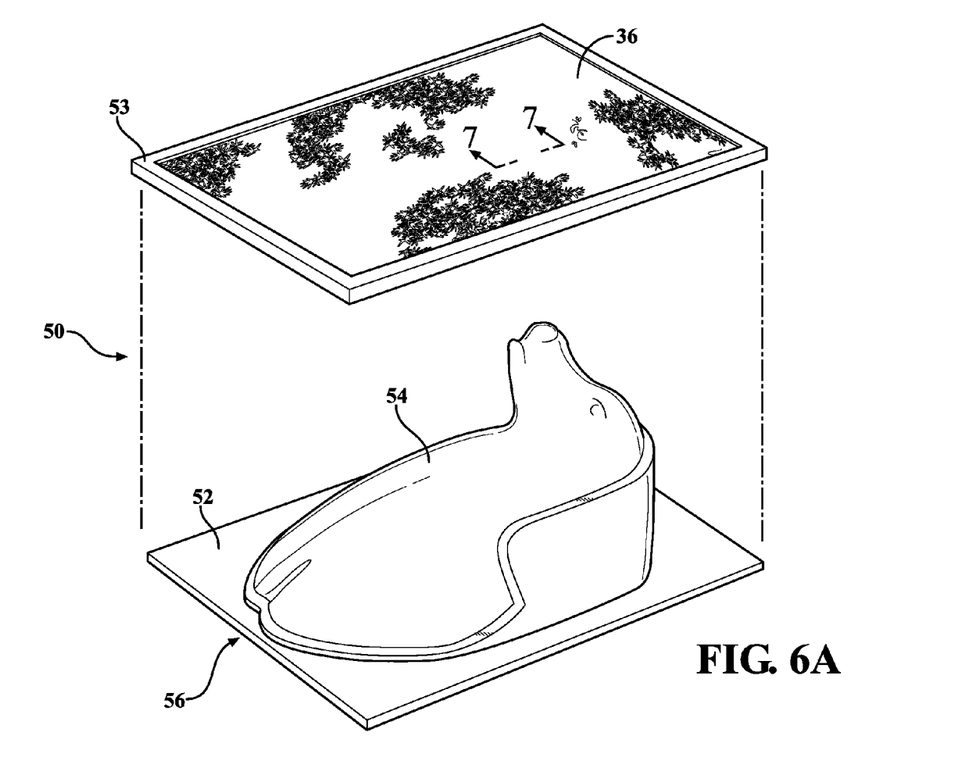
FIG. 6A is a perspective view of a thermoforming tool and a sheet of plastic for forming the first embodiment of the antler mounting kit.
Figure 6B:
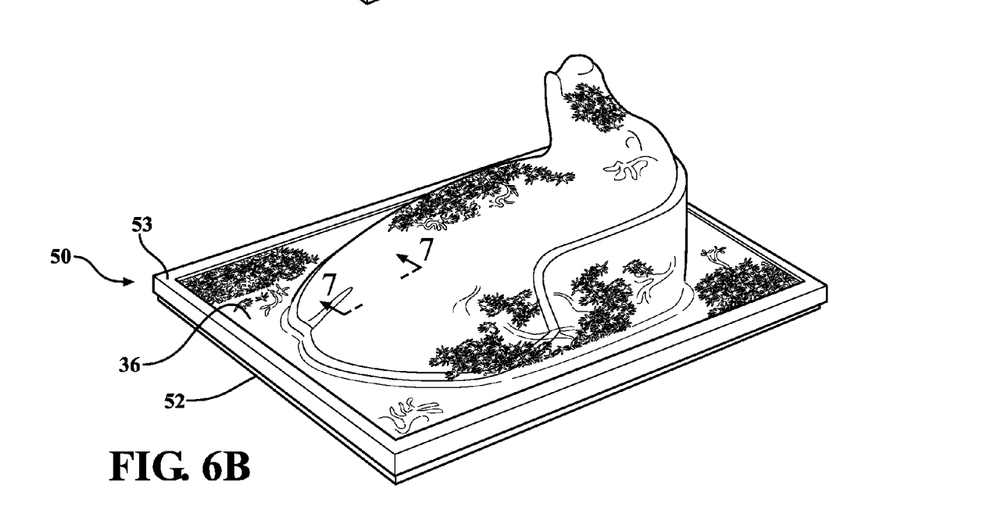
FIG. 6B is a perspective view of the thermoforming tool deforming the sheet of plastic.

As set forth further below, the body 14 is typically formed from a sheet 36 of plastic, as shown in FIGS. 6A-B, that includes the inner layer 32 and the outer layer 34. The outer layer 34 can be applied to the inner layer 32 before being shaped into the body 14, or alternatively, can be applied to body 14 after formation.

The cover 20 is typically formed separately from the body 14 and is subsequently assembled to the body 14. In other words, the cover 20 of the first embodiment is further defined as a cap 38. As best shown in FIGS. 2-4, the body 14 presents a first edge 40 along the cutout 16 and a second edge 42 along the cutout 16 spaced from the first edge 40 defining the cutout 16 therebetween. As set forth above, the cover 20 abuts the body 14 and covers the cutout 16 for concealing the base 18 of the antlers 12. The cover 20 extends from the first edge 40 to the second edge 42. Specifically, the cover 20 includes a perimeter 44 that follows a shape of the first edge 40 and a shape of the second edge 42 so that the cover 20 is flush with the body 14.

With reference to FIGS. 1-4, the cover 20 is typically oversized such that, after the antlers 12 are mounted to the mounting base 24, selected portions of the cover 20 can be cut, e.g., with scissors or a utility knife, to closely fit around the antlers 12. The cover 20 is shown in FIGS. 1-2 before being cut and the cover 20 is shown in FIGS. 3-4 after being cut. The cover 20, for example, can be cut to have a configuration that snaps between the antlers 12 and the body 14. It should be appreciated that the cover 20 alternatively can be formed to have shape that generally accommodates antlers 12.

The cover 20 typically sits on the body 14 without being attached to the body 14, as shown in FIGS. 4 and 5. Alternatively, the cover 20 can be attached to the body 14, for example, with screws, adhesive, etc.

As best shown in FIG. 1, typically the body 14 is hollow and the mounting base 24 is disposed inside the body 14. Specifically, the body 14 can define a platform 46 for abutting the base 18 of the antlers 12. The platform 46 and the mounting base 24 extend along the cutout 16. The mounting base 24 can be affixed to the platform 46 with the platform 46 disposed between the mounting base 24 and the cutout 16. In other words, the platform 46 and the mounting base 24 are aligned with the cutout 16 such that the base 18 of the antlers 12 can be positioned in the cutout 16 abutting the platform 46 and attached to the mounting base 24.

As shown in FIG. 2, the mounting base 24 can be, for example, affixed to the body 14 with a fastener 48 such as a screw, tack, etc. In the alternative or in addition, the mounting base 24 can be retained to the body 14, for example, by applying a coating, foam, plastic, rubber, adhesive, etc., into the body 14 to affix the mounting base 24 to the body 14. It should be appreciated that the mounting base 24 can be affixed to the body 14 in any suitable fashion without departing from the nature of the present invention.

In use, the user receives the antler mounting kit 10 typically in a partially assembled state with the cover 20 separated from the body 14 as shown in FIG. 2. The user affixes the antlers 12 to the mounting base 24, as set forth above and as shown in FIG. 3. The user then cuts selected portions of the cover 20, if necessary, to fit around the antlers 12 and assembles the cover 20 to the body 14, as set forth above. As shown in FIG. 4, the antler mounting kit 10 displays the antlers 12.

The ears 62 of the antler mounting kit 10 may be unassembled from the rest of the body 14 when the user receives the antler mounting kit 10. In such a scenario, the user also assembles the ears 62 to the rest of the body 14. For example, the ears 62 can be connected to the rest of the body 14 with screws (not shown). Additional pieces of material that is the same as or similar to the material of the outer layer 34 can accompany the antler mounting kit 10 and can be used to cover any screws and/or screw holes.

As shown in FIGS. 6A-6B, the body 14 can be formed by thermoforming. In thermoforming, the body 14 is typically made from the sheet 36 of plastic, as set forth above. The sheet 36 of plastic is, for example, heated and compressed into the shape of the body 14. However, it should be appreciated that the body 14 can be formed in alternative ways, such as plastic injection molding or any other fashion without departing from the nature of the present invention.

In the process of thermoforming, a thermoforming tool 50 is used to shape the body 14 from the sheet 36 of plastic. The thermoforming tool 50 includes a mold 52 for forming the sheet 36 of plastic and a frame 53 that moves the sheet 36 of plastic toward the mold 52. Specifically, the mold 52 has a body protrusion 54 for forming the sheet 36 of plastic in the shape of the body 14. The sheet 36 of plastic is heated, for example, with an external source and/or the mold 52 can be heated to heat the sheet 36 of plastic. The heated sheet 36 of plastic and the mold 52 are then brought together to deform the sheet 36 of plastic about the mold 52. Vacuum can also be applied to the sheet 36 of plastic to encourage deformation of the sheet 36 of plastic about the body protrusion 54.

The thermoforming tool 50 is typically configured to form two halves 56 of the body 14, as best shown in FIG. 1, i.e., has a body protrusion 54 for each half 56 of the body 14, and the two halves 56 of the body 14 are subsequently attached together. The thermoforming tool 50 can include two separate molds 52 each having a body protrusion 54 to form one of the halves 56. One of the two separate molds 52 is shown in FIGS. 6A-6B. Alternatively, although not shown in the Figures, the thermoforming tool 50 can include a single mold that forms both halves 56 of the body 14, i.e., has a body protrusion for each half 56. The thermoforming tool 50 can also include a cover protrusion (not shown) for forming the cover 20 from the sheet 36 of plastic. The cover 20 protrusion can be on the same mold(s) 52 as one or both body protrusions 54 or, alternatively, can be on a separate mold.

As best shown in FIG. 1, one of the halves 56 of the body 14 includes a recessed lip 82. The recessed lip 82 is recessed so as to fit within the other half 56 of the body 14 along a seam 58 between the halves 56 of the body 14. For example, the back half 56 in FIG. 1, i.e., the half 56 that is shown in the back in FIG. 1, includes the recessed lip 82. The front half 56 in FIG. 1 overlaps the recessed lip 82 of the back half 56 along the seam 58. The mold 52 of the thermoforming tool 50 can include a ledge (not shown) to create the recessed lip 82 on one of the halves 56. Typically, the half 56 that is shown in the back in FIG. 1 includes the recessed lip 82, as shown in FIG. 1. Alternatively, the half 56 that is shown in the front in FIG. 1 includes the recessed lip 82.

The thermoforming tool 50 can also include ear protrusions (not shown) shaped to form ears 62 of the body 14 from the sheet 36 of plastic. The ears 62 typically present a coloration pattern matching the coloration pattern of the body 14 and the cover 20. Each ear 62 can be formed in two pieces and subsequently assembled together. For example, the thermoforming tool 50 can include a rear ear protrusion for forming a back portion of the ear 62 and a front ear protrusion for forming a front portion of the ear 62. The back portion and the front portion of the ear 62 can be assembled together with an adhesive such as, for example, ABS glue. The back portion and the front portion of the ear 62 are typically each thinner than the rest of the body 14.

After being removed from the thermoforming tool 50, the halves 56 of the body 14 are trimmed, i.e., any excess material and flashing is removed. In the scenario where the cover 20 and/or the ears are formed with the thermoforming tool 50, the cover 20 and/or ears are also removed from the thermoforming tool 50 and trimmed. The two halves 56 of the body 14 are typically permanently bonded to each other along the seam 58. For example the two halves 56 can be bonded together along the seam 58 with ABS glue. In addition or in the alternative, the two halves 56 can be taped together along the seam 58. In addition or in the alternative, a bead of caulk (not shown) is applied to the seam 58. In addition or in the alternative, a coating, such as foam, rubber, plastic, adhesive, etc., can be applied to the two halves 56 of the body 14 to structurally reinforce the body 14 along the seam 58. As one example, the coating can be a liquid polymer such as a polyurethane coating applied to the seam 58 to hold the two halves 56 together. The caulk and/or coating are typically applied to the seam 58 along the inner layer 32 and/or along the recessed lip 82. A mounting hanger 60, which can be formed of plastic, wood, etc., is typically stapled, screwed, adhered, etc., to the body 14.

The thermoforming process typically creates the body 14 to be hollow, as set forth above. The mounting base 24 can be applied to the hollow body 14 after formation of the body 14 as set forth above. Likewise, eyes 64 can be formed separately and retained to the body 14 by applying a coating, foam, plastic, rubber, adhesive, etc. into the body 14. Before such application, the eyes 64 are typically hot glued to the body 14. The body 14 is typically formed without holes for the eyes 64 and holes are trimmed into the body 14 to receive the eyes 64. Alternatively, they eyes 64 can be formed by shaping the body 14 to include contours in the shape of the eyes 64. The outer layer 34 can be removed along the contours of the eyes 64 to expose the inner layer 32 in the eyes 64.

With reference now to the second embodiment in FIGS. 8 and 9, the inner layer 132 of the body 14 can be formed from foam and the outer layer 134 of the body 14 can be formed from a polymeric covering disposed over the foam. The foam can be, for example, a two-part polyurethane foam; however, it should be appreciated that the inner layer 132 can be formed of any type of suitable material without departing from the nature of the present invention. The outer layer 134 can be, for example, vinyl; however, it should be appreciated that the outer layer 134 can be of any type of suitable material without departing from the nature of the present invention. The outer layer 134 is typically formed from a material that is flexible so that the foam inner layer 132 can fill the outer layer 134. In an alternative embodiment, the outer layer 134 can be paint or another type of colorant/surface texturing that is applied directly to the foam of the inner layer 132. Paint or another type of colorant/surface texturing can also be applied to the outer layer 134. The outer layer 134 is typically a material that is easily cleaned and maintained.

In the second embodiment, the mounting base 24 can be formed separately from the body 14 and subsequently fixed to the body 14. In such an embodiment, the mounting base 24 can be overmolded by the foam of the inner layer 132, as set forth further below. When overmolded, the mounting base 24 is typically at least partially encapsulated by the foam of the inner layer 132 so that the foam rigidly supports the mounting base 24. Alternatively, the mounting base 24 can be integrally formed with the body 14, e.g., as a dense foam or a plastic block that has a dimensions sufficient to attach to and support the antlers 12. In such an embodiment, the body 14 is typically formed of a relatively low density foam and the mounting base 24 is typically formed of a relatively high density material for firmly receiving the screws.

In the second embodiment, the cover 20 is further defined as at least one flap 66 that is connected to the outer layer 134 near the mounting base 24 and is moveable so that the mounting base 24 can be exposed. Specifically, the flap 66 typically includes a fixed end 68 fixed to the outer layer 134 and a free end 70 that extends loosely from the fixed end 68. The flap 66 is typically formed from the same type of material as the outer layer 134 and is integrally formed with the outer layer 134 so that the flap 66 seamlessly extends from the outer layer 134 at the fixed end 68 of the flap 66, i.e., as a single piece with the outer layer 134. The cover 20 can have more than one flap 66. However, it should be appreciated that the cover 20 can include any number of flaps 66 without departing from the nature of the present invention.

The fixed ends 68 of the flaps 66 are typically disposed near sides of the mounting base 24 such that the flaps 66 are moved toward each other toward the middle of the base 18 of the antlers 12. Alternatively, the fixed end 68 can be disposed forward of the mounting base 24, i.e., closer to the snout of the body 14, so that, when the antlers 12 are affixed to the mounting base 24, the flap 66 can be extended back, i.e., toward the neck of the body 14, over the base 18 of the antlers 12. In an alternative embodiment, the flap 66 can be a separate, i.e., unattached, piece of material the same as or similar to the material of the outer layer 134. This separate flap 66 can cover 20 the base 18 of the antlers 12 and adhere to the outer layer 134.

The antlers 12 are mounted to the mounting base 24, as set forth above, and the flap 66 is extended over the base 18 of the antlers 12 and the free end 70 of the flap 66 is secured to the outer layer 134 to conceal the base 18 of the antlers 12. The outer layer 134 and the flap 66 can be formed of a common material that adheres to itself so that the flap 66 adheres to the outer layer 134 when the flap 66 is extended over the base 18 of the antlers 12 and contacted with the rest of the outer layer 134. Alternatively, or in addition, an adhesive can be applied to the flap 66 to adhere the flap 66 to the base 18 of the antlers 12 and to the outer layer 134. A removable backing (not shown) can be disposed on the flap 66 to prevent inadvertent adhesion between the flap 66 and the outer layer 134. Free edges of the flap 66 can be wavy, which aids in matching any type of color pattern on the free edges with that of the outer layer 134.

If the shape of the body 14 is one that is typically mounted to a wall for display, a mounting hanger 60 can be disposed in or on the body 14. The body 14 is fixed to the mounting hanger 60 and the mounting hanger 60 typically includes features for being mounted to a wall.

The body 14 can include features such as eyes 64 and ears 62. The eyes 64 and ears 62 can be integrally formed with the rest of the cover 20 and body 14, i.e., formed with the rest of the cover 20 and body 14 as a single piece, or alternatively, can be separately formed components that are subsequently added to rest of the cover 20 and body 14.

Additional pieces of material that is the same as or similar to the material of the outer layer 134 can accompany the antler mounting kit 10. These additional pieces can be applied to the outer layer 134 to match the flap 66 with the rest of the outer layer 134 and/or to patch damaged areas of the outer layer 134. Also, in an embodiment where the ears 62 are attached to the rest of the body 14 by the user, the ears 62 are typically screwed into the rest of the body 14 and the small pieces can be used to cover any screws and/or screw holes.

The body 14 can be manufactured with the use of a mold 72 as shown in FIG. 9. The mold 72 can be, for example, a foam mold such that liquid components of foam can be introduced into the mold 72 to take the shape of the mold 72.

The outer layer 134 can be added to the inner layer 132 during the formation of the body 14. For example, the outer layer 134 can be disposed in the mold 72 when the material used to manufacture the inner layer 132 is disposed into the mold 72, e.g., when the foam fills the outer layer 134 in the mold 72. Alternatively, the inner layer 132 can be formed without the outer layer 134 and the outer layer 134 can be subsequently applied to the inner layer 132.

The mold 72 can be, for example, a two piece mold 72 having a first mold half 74 and a second mold half 76. The outer layer 134 can be initially divided into a first portion 78 that is placed into the first mold half 74 and a second portion 80 that is placed into the second mold half 76. The outer layer 134 can be flexible, as set forth above, and can generally assume the shape of the mold 72 half. The first and second portions 78, 80 of the outer layer 134 typically overflow around edges of the first and second mold halves 74, 76, respectively. The first and second mold halves 74, 76 are then brought together and the first and second portions 78, 80 of the outer layer 134 contact each other. The first and second portions 78, 80 of the outer layer 134 naturally adhere to each other, as set forth above, and/or can be adhered together with an adhesive and/or heat. In the embodiment where the mounting base 24 is formed separately from the body 14, the mounting base 24 can be disposed in the outer layer 134 in the mold 72 to be at least partially encapsulated by the foam of the inner layer 132 in the mold 72.

The material to create the inner layer 132 is disposed, typically in a liquid form, into the outer layer 134 such that the outer layer 134 is disposed between the inner layer 132 and the mold 72. Upon solidification, the first and second mold halves 74, 76 are separated and the inner layer 132 and the outer layer 134 are fixed together and removed from the mold 72 as a unit. If necessary, the seam between the first and second portions of the outer layer 134 can be trimmed to remove excess material.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An antler mounting kit for displaying antlers obtained from a live animal, said antler mounting kit comprising:
    a body that replicates natural contours of at least a portion of a head of the live animal;
    a mounting base fixed relative to said body and positioned to support the antlers in an anatomically correct position that replicates antler position on the head of the live animal; and
    at least one mounting feature fixed to said mounting base for engaging the antlers and for retaining the antlers on said body;
    said body being formed from a polymer and including an outward surface that presents a coloration pattern different than a natural color of the live animal.

2. The antler mounting kit as set forth in claim 1 wherein said coloration pattern is a camouflage pattern.

3. The antler mounting kit as set forth in claim 1 wherein said polymer is further defined as plastic.

4. The antler mounting kit as set forth in claim 1 wherein polymer is further defined as plastic and wherein said body includes a paint applied to said plastic and presenting said outward surface.

5. The antler mounting kit as set forth in claim 1 wherein said mounting feature is further defined as a threaded fastener.

6. The antler mounting kit as set forth in claim 1 wherein said mounting feature includes one of a post, adhesive, clip, or tie-down.

7. The antler mounting kit as set forth in claim 1 further comprising a cover that replicates the natural contours of a portion of the head of the animal and abuts said body for concealing a base of the antler.

8. The antler mounting kit as set forth in claim 7 wherein said body defines a cutout extending along said mounting base for receiving the base of the antlers and said cover covers said cutout.

9. The antler mounting kit as set forth in claim 8 wherein said body presents a first edge along said cutout and a second edge along said cutout spaced from said first edge defining said cutout therebetween, said cover extending from said first edge to said second edge.

10. The antler mounting kit as set forth in claim 9 wherein said cover includes a perimeter that follows a shape of the first edge and a shape of the second edge so that said cover is flush with said body.

11. The antler mounting kit as set forth in claim 8 wherein said body defines a platform along said cutout for abutting the base of the antlers, said mounting base being affixed to said platform with said platform disposed between said mounting base and said cutout.

12. The antler mounting kit as set forth in claim 7 wherein said cover is formed separately from said body and is subsequently assembled to said body.

13. The antler mounting kit as set forth in 7 wherein said cover presents a coloration pattern matching said coloration pattern of said body.

14. The antler mounting kit as set forth in claim 1 wherein said mounting base is formed separately from said body and subsequently affixed to said body.

15. The antler mounting kit as set forth in claim 1 wherein said body is hollow and said mounting base is disposed inside said body.

16. The antler mounting kit as set forth in claim 1 wherein said body includes an inner layer and an outer layer laminated to said inner layer, said outer layer presenting said outward surface.

17. The antler mounting kit as set forth in claim 1 wherein said body includes an inner layer formed from plastic and an outer layer presenting said outward surface, said outer layer being a film laminated to said inner layer.

18. An antler mounting kit for displaying antlers obtained from a live animal, said antler mounting kit comprising:
    a body that replicates natural contours of at least a portion of a head of the live animal;
    a mounting base fixed relative to said body and positioned to support the antlers in an anatomically correct position that replicates antler position on the head of the live animal; and
    a mounting feature fixed to said mounting base for engaging the antlers and for retaining the antlers on said body;
    said body being formed from plastic and including a paint applied to said plastic, said paint including an outward surface that presents a coloration pattern different than a natural color of the live animal, wherein said coloration pattern is a camouflage pattern.

19. The antler mounting kit as set forth in claim 18 wherein said mounting feature is further defined as a threaded fastener.

* * * * *